(12) United States Patent
Koishi et al.

(10) Patent No.: US 11,063,506 B2
(45) Date of Patent: Jul. 13, 2021

(54) POWER CONVERTER

(71) Applicant: DENSO CORPORATION, Kariya (JP)

(72) Inventors: Ayuki Koishi, Toyota (JP); Takashi Yamada, Toyota (JP); Yoshihiko Hiya, Toyota (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/715,025

(22) Filed: Dec. 16, 2019

(65) Prior Publication Data
US 2020/0220449 A1 Jul. 9, 2020

(30) Foreign Application Priority Data

Jan. 8, 2019 (JP) .............................. JP2019-001423

(51) Int. Cl.
| | |
|---|---|
| *H02M 1/08* | (2006.01) |
| *H02M 3/158* | (2006.01) |
| *H02M 7/5387* | (2007.01) |
| *H02M 1/00* | (2006.01) |
| *H02P 27/08* | (2006.01) |

(52) U.S. Cl.
CPC ............. *H02M 1/08* (2013.01); *H02M 3/158* (2013.01); *H02M 7/53871* (2013.01); *H02M 2001/0054* (2013.01); *H02P 27/08* (2013.01)

(58) Field of Classification Search
None
See application file for complete search history.

(56) References Cited

U.S. PATENT DOCUMENTS

| | | | |
|---|---|---|---|
| 2019/0229644 A1 | 7/2019 | Miyake | |
| 2020/0180451 A1* | 6/2020 | Kawamura | ........... H02M 3/155 |
| 2020/0252012 A1* | 8/2020 | Hidaka | ............... H02P 29/0241 |

FOREIGN PATENT DOCUMENTS

| | | |
|---|---|---|
| JP | 2014-027816 A | 2/2014 |
| JP | 2019-129629 A | 8/2019 |

* cited by examiner

*Primary Examiner* — Jeffrey A Gblende
*Assistant Examiner* — Henry E Lee, III
(74) *Attorney, Agent, or Firm* — Sughrue Mion, PLLC

(57) ABSTRACT

A switching circuit may include first and second switching elements that are connected in parallel with each other. A controller may be configured to selectively perform either a first switching control to drive the first switching element or a second switching control to drive the second switching element. The first switching element may be constituted mainly of a first semiconductor material, and the second switching element may be constituted mainly of a second semiconductor material having a narrower band gap than the first semiconductor material. The second switching element may be larger in size than the first switching element. The controller may be configured to switch to the second switching control when an instruction value and/or an actual value of the current exceeds a predetermined threshold value while performing the first switching control.

6 Claims, 7 Drawing Sheets

POWER CONVERTER

CROSS-REFERENCE TO RELATED APPLICATION

This application claims priority to Japanese patent application No. 2019-001423, filed on Jan. 8, 2019, the entire contents of which are incorporated herein by reference.

TECHNICAL FIELD

The technology disclosed herein relates to a power converter.

BACKGROUND

A power converter that converts electric power between a power source and an electric load, such as a DC-DC converter and an inverter, has been known. A power converter of this type connects a power source and an electric load via one or more switching circuits, and is configured to convert electric power between the power source and the electric load by, for example, Pulse Width Modulation (PWM)-control over each switching circuit.

For example, Japanese Patent Application Publication No. 2014-27816 describes an inverter. This inverter includes switching circuits each including two switching elements connected in parallel, and drives one of the two switching elements preferentially in accordance with current flowing through the switching circuit concerned. One of the switching elements is an Insulated Gate Bipolar Transistor (IGBT), and the other of the switching elements is a Metal-Oxide-Semiconductor Field-Effect Transistor (MOSFET). As a semiconductor material constituting the MOSFET, silicon carbide (SiC) is proposed.

SUMMARY

Silicon carbide has a wider band gap than silicon (Si), and hence a silicon carbide switching element has an advantage over a silicon switching element in, for example, its smaller electric power loss. On the other hand, a silicon carbide switching element is more expensive than a silicon switching element, and hence adopting a silicon carbide switching element increases a manufacturing cost of a power converter. In view of this, the inverter described in Japanese Patent Application Publication No. 2014-27816 adopts a silicon carbide (or another wide-band-gap semiconductor) switching element only for one of the two switching elements. Such a configuration can achieve both improved performance and reduced cost of the power converter. The present disclosure provides a technology capable of further enhancing this advantage by suitably controlling these two switching elements.

The technology disclosed herein is embodied by a power converter that converts electric power between a power source and an electric load. This power converter may include a switching circuit and a controller. The switching circuit may be provided on a power supply path from the power source to the electric load, and may include a first switching element and a second switching element that are connected in parallel with each other. The controller may be configured to selectively perform either a first switching control to drive the first switching element or a second switching control to drive the second switching element, based on an instruction value for current flowing through the switching circuit and an actual value of the current flowing through the switching circuit. The first switching element may be constituted mainly of a first semiconductor material, and the second switching element may be constituted mainly of a second semiconductor material. A band gap of the second semiconductor material may be narrower than a band gap of the first semiconductor material. The second switching element may be larger in size than the first switching element. The controller may be configured to switch to the second switching control when at least one of the instruction value of the current and the actual value of the current exceeds a predetermined threshold value while performing the first switching control. The phrase "based on . . . an actual value of the current flowing through the switching circuit" used herein is not limited to being based on an indication obtained by directly measuring the actual value of the current, but also includes being based on another indication that enables estimation of the actual value of the current, such as an indication that varies with the actual value of the current.

In the above-described power converter, the first switching element, which is smaller in size than the second switching element, adopts a semiconductor material having a wider band gap (e.g., a wide-band-gap semiconductor). In general, a manufacturing cost of a switching element increases proportionately to its size, and this tendency is remarkable in a switching element that adopts a wide-band-gap semiconductor. In view of this, decreasing the size of the first switching element that adopts a wide-band-gap semiconductor can significantly reduce a manufacturing cost of the power converter.

Decreasing the size of the first switching element also decreases an allowable current of the first switching element. In view of this, in the above-described power converter, either the first switching control or the second switching control is selectively performed based on the instruction value for the current flowing through the switching circuit and the actual value of the current flowing through the switching circuit. The first switching control drives only the first switching element without driving the second switching element. On the other hand, the second switching control drives only the second switching element without driving the first switching element. Thus, when the instruction value for the current is smaller than the threshold value, the first switching control can be performed to exclusively utilize the first switching element, which has a smaller electric power loss. On the other hand, when the instruction value for the current is larger than the threshold value, the second switching control can be performed to exclusively utilize the second switching element, which has a larger allowable current.

However, even when the instruction value for the current is smaller than the threshold value, there may be a case where the current flowing through the switching circuit (i.e., the first switching element) exceeds the threshold value for some reason. In view of this, even when the instruction value for the current is smaller than the threshold value, the above-described power converter switches the first switching control to the second switching control when the actual value of the current flowing through the switching circuit exceeds the threshold value. A flow of excessively large current in the first switching element can thereby be avoided before it occurs.

T flow of excessively large current in the first switching element can indeed be avoided by switching between the first switching control and the second switching control based only on the actual value of the current flowing through the switching circuit. If switched based only on the actual value of the current flowing through the switching circuit, however, the switching controls might be switched frequently. This is because the actual value of the current flowing through the switching circuit greatly varies during a cycle of the switching control (e.g., a cycle of a carrier frequency in a PWM control). In contrast to this, the above-described power converter considers not only the actual value of the current flowing through the switching circuit, but also the instruction value for the current flowing through the switching circuit, to thereby suitably decrease the frequent switching between the switching controls while protecting the first switching element against the excessively large current.

DETAILED DESCRIPTION

Figure 1:
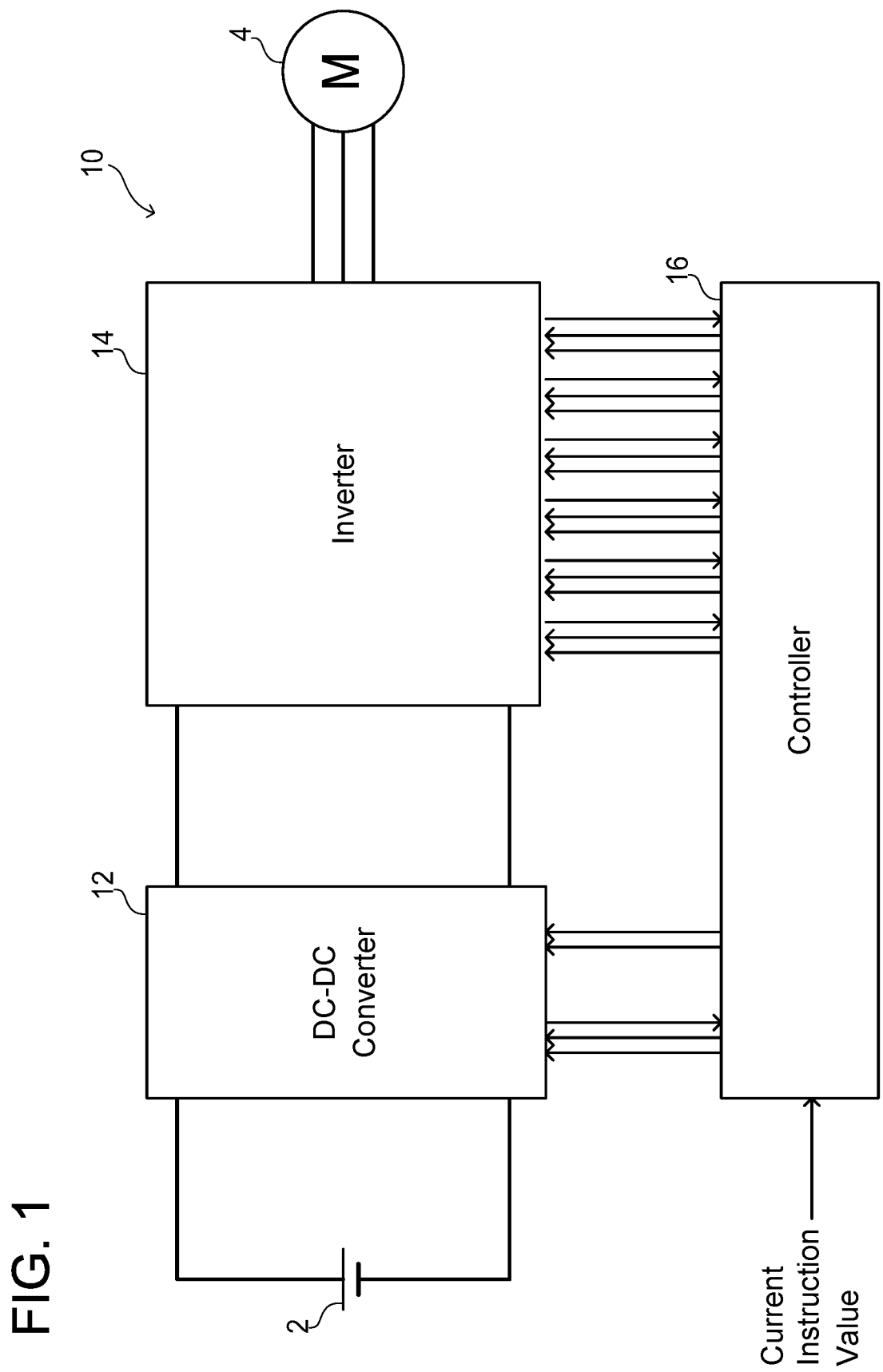
FIG. 1 is a block diagram showing a configuration of a power converter 10.

In an embodiment of the present technology, the controller may be configured to switch back to the first switching control when both the instruction value for the current and the actual value of the current fall below the threshold value after having switched to the second switching control. For example, when the actual value of the current falls below the threshold value while the second switching control is performed, the controller may switch back to the first switching control even though the cycle of the second switching control has not been completed yet. According to such a configuration, an opportunity to drive the first switching element increases, so an electric power loss in the switching circuit, for example, can be reduced.

In an embodiment of the present technology, the controller may be configured to switch back to the first switching control when a cycle of the second switching control has been completed after having switched to the second switching control. In other words, even when the actual value of the current falls below the threshold value while the second switching control is performed, the controller may continue the second switching control until the current cycle of the second switching control is completed. According to such a configuration, frequent switching between the switching controls is decreased, and the number of times the first switching element is switched can be reduced.

In an embodiment of the present technology, the controller may be configured to perform the second switching control when at least one of the instruction value for the current and the actual value of the current is predicted to exceed the threshold value. For example, when the instruction value for the current abruptly changes from a value exceeding the threshold value to a value below the threshold value, the actual value of the current flowing through the switching circuit might not be able to follow the change, as a result of which the actual value of the current flowing through the switching circuit might often exceed the threshold value in the subsequent one or more cycles. Therefore, when such a change occurs in the instruction value for the current, the controller may continue the second switching control in the subsequent one or more cycles, irrespective of the actual value of the current flowing through the switching circuit.

In an embodiment of the present technology, the first semiconductor material may be silicon carbide and the second semiconductor material may be silicon. However, the first semiconductor material is not limited to silicon carbide, and may be another wide-band-gap semiconductor, such as gallium nitride (GaN), gallium oxide ($Ga_2O_3$), or diamond. The wide-band-gap semiconductor mentioned herein widely means any semiconductor material having a band gap wider than a band gap of silicon. Similarly, the second semiconductor material is not limited to silicon, and may be, for example, a wide-band-gap semiconductor material. The first semiconductor material of the first switching element only needs to have a band gap wider than a band gap of the second semiconductor material of the second switching element.

In an embodiment of the present technology, the first switching element may be a MOSFET and the second switching element may be an IGBT. However, as another embodiment, the first switching element and the second switching element are not limited to a MOSFET and an IGBT, respectively, and may be switching elements classified as another type.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved power converters, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

With reference to the drawings, a power converter 10 of an embodiment will be described. As an example, the power converter 10 of the present embodiment is mounted on a vehicle such as a hybrid vehicle, a fuel-cell vehicle, or an electric vehicle, and converts electric power between a battery 2 and a motor 4 that drives wheels. However, the technology disclosed in the present embodiment can be adopted not only for the power converter 10 mounted on a vehicle, but also for power converters having various application purposes.

The motor 4 sometimes functions as an electric motor and at other times as an electric generator. When the motor 4 functions as an electric motor, electric power is supplied from the battery 2 to the motor 4 through the power converter 10. In this case, the battery 2 serves as a power source and the motor 4 serves as an electric load. On the other hand, when the motor 4 functions as an electric generator, electric power is supplied from the motor 4 to the battery 2 through the power converter 10. In this case, the motor 4 serves as a power source and the battery 2 serves as an electric load.

As shown in FIG. 1, the power converter 10 includes a DC-DC converter 12, an inverter 14, and a controller 16. The DC-DC converter 12 is provided between the battery 2 and the inverter 14. The DC-DC converter 12 is a step-up and step-down DC-DC converter, and can step up and step-down DC electric power between the battery 2 and the inverter 14. The inverter 14 is provided between the DC-DC converter 12 and the motor 4. The inverter 14 is a three-phase inverter, and can convert DC electric power into three-phase AC electric power and vice versa between the DC-DC converter 12 and the motor 4.

For example, if the motor 4 functions as an electric motor, DC electric power supplied from the battery 2 is stepped up in the DC-DC converter 12 and furthermore converted into three-phase AC electric power in the inverter 14, and is then supplied to the motor 4. The three-phase AC motor 4 is thereby driven by the DC electric power supplied from the battery 2. On the other hand, if the motor 4 functions as an electric generator, three-phase AC electric power supplied from the motor 4 is converted into DC electric power in the inverter 14 and furthermore stepped down in the DC-DC converter 12, and is then supplied to the battery 2. The battery 2 is thereby charged with the electric power generated by the motor 4.

Figure 2:
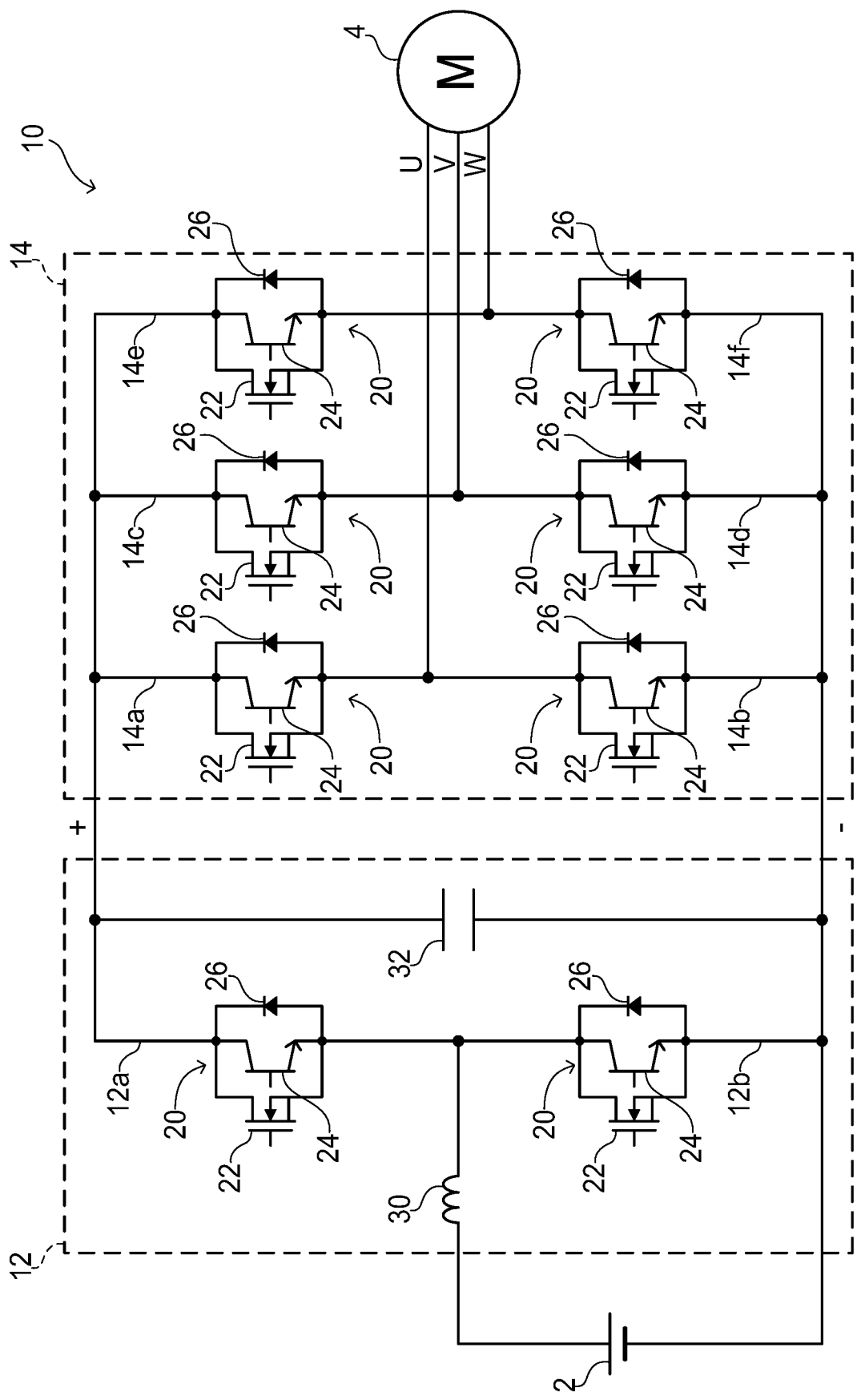
FIG. 2 is a circuit diagram showing an example of a circuit structure of the power converter 10.

FIG. 2 shows an example of a circuit structure of each of the DC-DC converter 12 and the inverter 14. As shown in FIG. 2, the DC-DC converter 12 and the inverter 14 is each configured with a plurality of switching circuits 20. Each of the switching circuits 20 is provided on a power supply path between the battery 2 and the motor 4, and its operation is controlled by the controller 16. Each switching circuit 20 includes a first switching element 22, a second switching element 24, and a diode 26. The configuration of the switching circuits 20 will be described in detail later.

Except for the configuration of the switching circuits 20, other configurations of the DC-DC converter 12 and the inverter 14 are in common with those of known DC-DC converters and known inverters. For example, the DC-DC converter 12 includes two switching circuits 20, an inductor 30, and a smoothing capacitor 32. One of the switching circuits 20 is provided at an upper arm 12a of the DC-DC converter 12, and the other of the switching circuits 20 is provided at a lower arm 14a of the DC-DC converter 12. The inverter 14 includes six switching circuits 20. These switching circuits 20 are respectively provided at a U-phase upper arm 14a, a U-phase lower arm 14b, a V-phase upper arm 14c, a V-phase lower arm 14d, a W-phase upper arm 14e, and a W-phase lower arm 14f. The configurations of the DC-DC converter 12 and the inverter 14 described herein are merely examples, and can be modified as appropriate. As another embodiment, the power converter 10 may include the DC-DC converter 12 only, or may include the inverter 14 only. Moreover, the power converter 10 may be a step-up (or step-down) DC-DC converter. In this case, the power converter 10 only needs to include one switching circuit 20.

As mentioned before, each switching circuit 20 includes the first switching element 22 and the second switching element 24. The first switching element 22 and the second switching element 24 are connected in parallel with each other. The first switching element 22 is a MOSFET constituted mainly of silicon carbide (SiC), and the second switching element 24 is an IGBT constituted mainly of silicon (Si). Silicon carbide, which has a band gap wider than a band gap of silicon, is termed a wide-band-gap semiconductor. Silicon carbide is an example of a first semiconductor material in the present technology, and silicon is an example of a second semiconductor material in the present technology. The first semiconductor material adopted for the first switching element 22 is not limited to silicon carbide, and may be another wide-band-gap semiconductor such as gallium nitride (GaN), gallium oxide ($Ga_2O_3$), or diamond. Moreover, the second semiconductor material adopted for the second switching element 24 is not limited to silicon. The first semiconductor material adopted for the first switching element 22 only needs to have a band gap wider than a band gap of the second semiconductor material adopted for the second switching element 24. Moreover, the first switching element 22 is not necessarily limited to a MOSFET, and the second switching element 24 is not necessarily limited to an IGBT.

Figure 3:
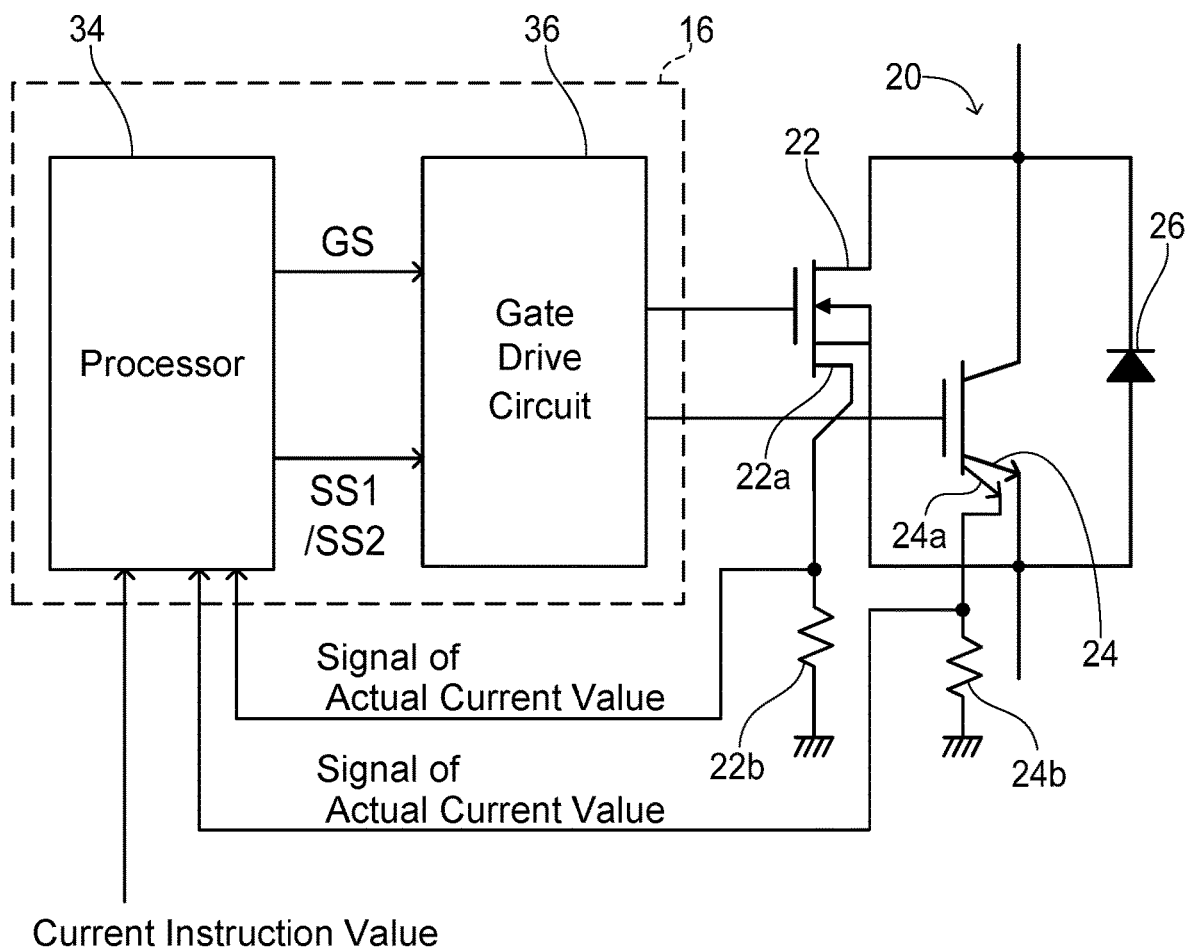
FIG. 3 is a block diagram showing an example of a configuration of a controller 16.

As shown in FIG. 3, each first switching element 22 and each second switching element 24 are connected to the controller 16, and are individually controlled by the controller 16. The controller 16 can selectively perform either a first switching control for PWM-control of the first switching element 22 or a second switching control for PWM-control of the second switching element 24, in accordance with an instruction value for current which is inputted from, for example, an electronic control unit of the vehicle. The instruction value for current mentioned herein includes an instruction value for current flowing through the DC-DC converter 12 and an instruction value for current flowing through the inverter 14 (hereinbelow an instruction value for current will be referred to as "current instruction value"). The two switching circuits 20 provided in the DC-DC converter 12 are controlled in accordance with the current instruction value for the DC-DC converter 12. On the other hand, the six switching circuits 20 provided in the inverter 14 are controlled in accordance with the current instruction value for the inverter 14.

Each first switching element 22 is provided with a current sense terminal 22a. The current sense terminal 22a outputs minute current proportional to an actual value of current flowing through the first switching element 22 (hereinbelow an actual value for current will be referred to as "actual current value"). The current sense terminal 22a of the first switching element 22 is connected to a reference potential via a first shunt resistance element 22b. Due to this, in the first shunt resistance element 22b, a voltage drop occurs in response to the output current of the current sense terminal 22a. One end of the first shunt resistance element 22b is connected to the controller 16, and the voltage occurring in the first shunt resistance element 22b is inputted to the controller 16 as a signal of the actual current value of the first switching element 22. As mentioned before, the output current of the current sense terminal 22a is proportional to the actual current value of the first switching element 22. Therefore, the signal of the actual current value of the first switching element 22, which is inputted to the controller 16, varies in accordance with the actual current value of the first switching element 22. Based on this signal of the actual current value, the controller 16 can be aware of the actual current value of the current flowing through the first switching element 22. As another embodiment, the controller 16 may be aware of the actual current value of the current flowing through the first switching element 22, based on another indication such as a voltage across the first switching element 22.

Similarly, each second switching element 24 is provided with a current sense terminal 24a. The current sense terminal 24a outputs minute current proportional to an actual current value of current flowing through the second switching element 24. The current sense terminal 24a of the second switching element 24 is connected to the reference potential via a second shunt resistance element 24b. Due to this, in the second shunt resistance element 24b, a voltage drop occurs in response to the output current of the current sense terminal 24a. One end of the second shunt resistance element 24b is connected to the controller 16, and the voltage occurring in the second shunt resistance element 24b is inputted to the controller 16 as a signal of the actual current value of the second switching element 24. Based on this signal of the actual current value, the controller 16 can be aware of the actual current value of the current flowing through the second switching element 24. As another embodiment, the controller 16 may be aware of the actual current value of the current flowing through the second switching element 24, based on another indication such as, a voltage across the second switching element 24.

The controller 16 of the present embodiment includes a processor 34 and a gate drive circuit 36. The above-described current instruction value and two signals of the actual current values are inputted to the processor 34. Based on the inputted current instruction value and two signals of the actual current values, the processor 34 outputs a gate drive signal GS and one of selection signals SS1 and SS2 to the gate drive circuit 36. In accordance with the gate drive signal GS and the selection signal SS1 or SS2, the gate drive circuit 36 performs either the first switching control or the second switching control. Specifically, when the processor 34 outputs the selection signal SS1, the first switching control is performed and the first switching element 22 is driven based on the gate drive signal GS. On the other hand, when the processor 34 outputs the selection signal SS2, the second switching control is performed and the second switching element 24 is driven based on the gate drive signal GS.

Figure 4:
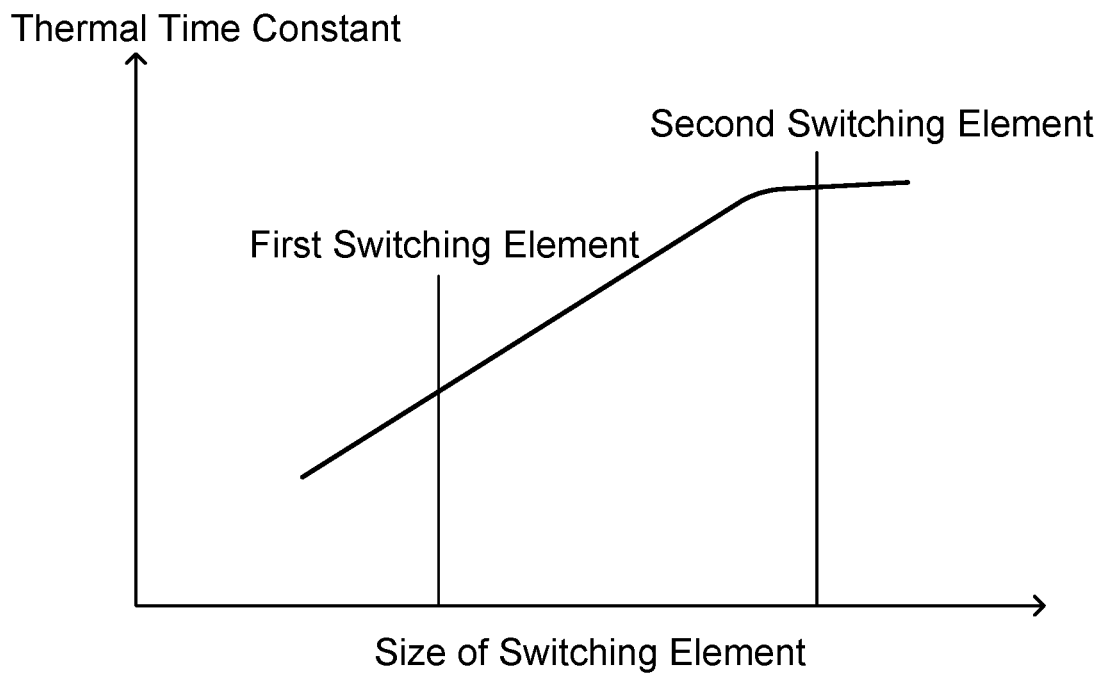
FIG. 4 is a graph illustrating a relation between sizes and thermal time constants of switching elements 22, 24.

In the power converter 10 of the present embodiment, the first switching elements 22 adopt silicon carbide, which is a wide-band-gap semiconductor. In general, manufacturing costs of the switching elements 22, 24 increase proportionately with their sizes, and this tendency is remarkable in the first switching elements 22 that adopt a wide-band-gap semiconductor. In view of this, in the present embodiment, the first switching elements 22 are smaller in size than the second switching elements 24, to thereby reduce the manufacturing cost. On the other hand, as shown in FIG. 4, the switching elements 22, 24 with smaller sizes have smaller thermal time constants (i.e., are heated more easily). Therefore, decreasing the size of the first switching elements 22 increases fatigue that the first switching elements 22 suffer owing to its thermal history. Moreover, decreasing the size of the first switching elements 22 decreases strength of the first switching elements 22 accordingly. In other words, decreasing the size of the first switching elements 22 that adopt silicon carbide in order to reduce a manufacturing cost of the power converter 10 increases damage to the first switching elements 22 and decreases, for example, durability of the power converter 10. The sizes of the switching elements 22, 24 herein refer to sizes in the plan view, and are also termed, for example, chip sizes.

Figure 5:
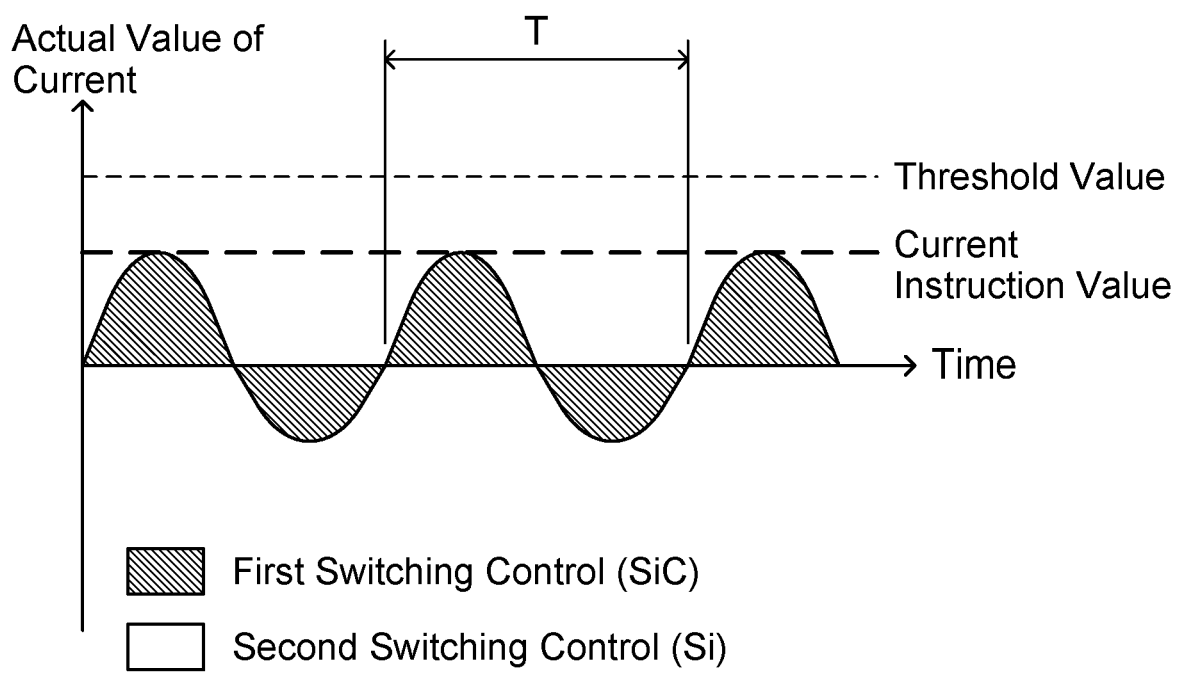
FIG. 5 is a graph showing an instruction value for current flowing through a switching circuit 20 and an actual value of the current flowing through the switching circuit 20, and shows an example of a state where only a first switching control is performed.
Figure 6:
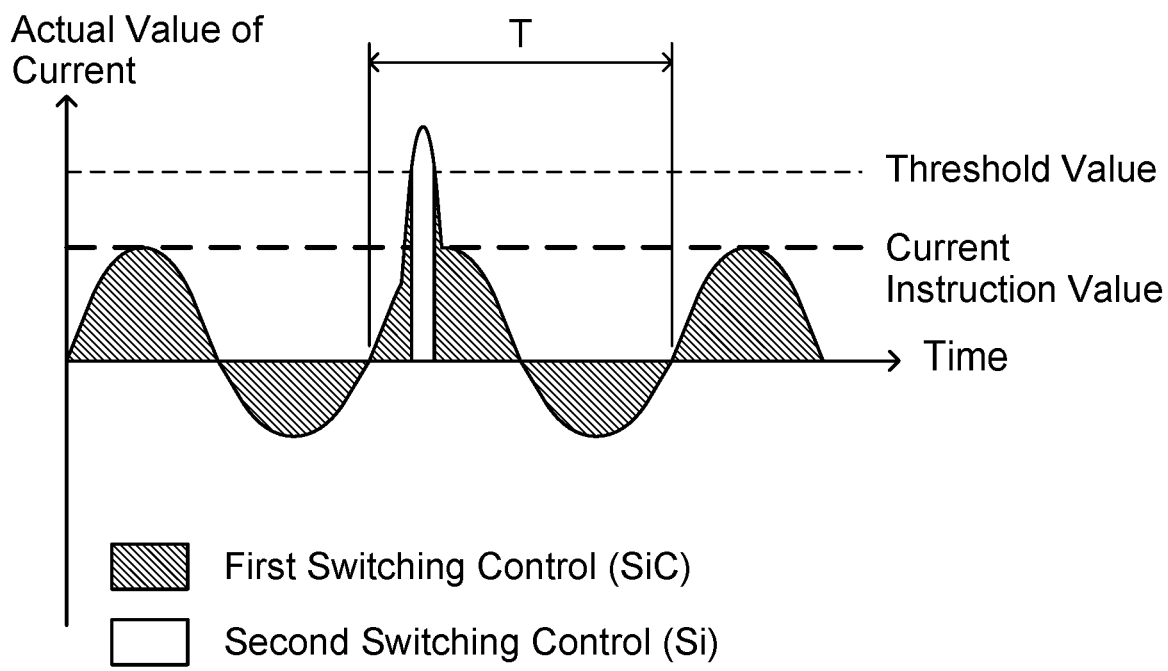
FIG. 6 is a graph showing the instruction value for the current flowing through the switching circuit 20 and the actual value of the current flowing through the switching circuit 20, and shows an example of a state where either the first switching control or the second switching control is selectively performed. In this example, the second switching control is switched back to the first switching control when both the instruction value for the current and the actual value of the current fall below a threshold value after switching to the second switching control. A hatched range shows a time frame during which the first switching control is performed, and another range shows a time frame during which the second switching control is performed. The same applies to FIGS. 7 to 11.
Figure 7:
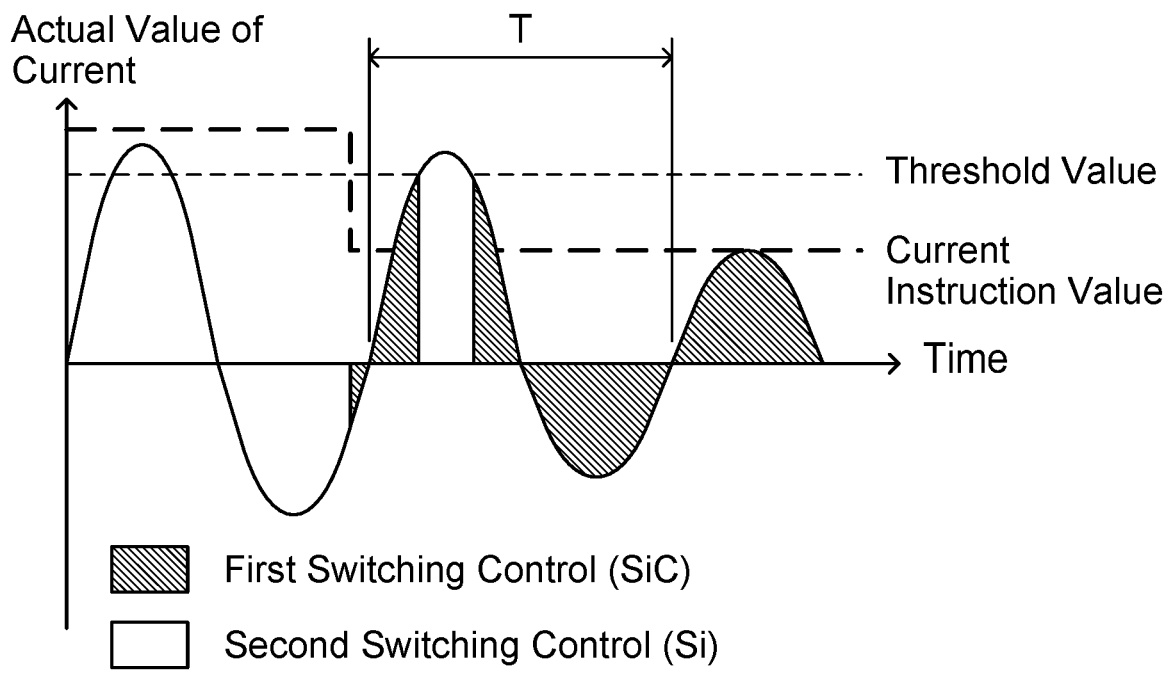
FIG. 7 is a graph showing the instruction value for the current flowing through the switching circuit 20 and the actual value of the current flowing through the switching circuit 20, and shows an example of a state where either the first switching control or the second switching control is selectively performed. In this example, the second switching control is switched back to the first switching control when both the instruction value for the current and the actual value of the current fall below the threshold value after switching to the second switching control.

For the above-described problems, in the power converter 10 of the present embodiment, the controller 16 is configured to selectively perform either the first switching control or the second switching control on each switching circuit 20, based on the current instruction value for the switching circuit 20 and the actual current value of the current flowing through the switching circuit 20. Specifically, as shown in FIG. 5, when both the current instruction value for the switching circuit 20 and the actual current value of the current flowing through the switching circuit 20 are below a threshold value, the controller 16 performs the first switching control, so as to exclusively drive the first switching element 22, which has a smaller electric power loss. As shown in FIGS. 6 and 7, when at least one of the current instruction value and the actual current value exceeds the predetermined threshold value while the first switching control is performed, the controller 16 switches to the second switching control. The controller 16 thereby stops driving the first switching element 22 and exclusively drives the second switching element 24, which has a larger allowable current (rated current). This can avoid a flow of excessively large current in the first switching element 22 before it occurs.

As described above, in the power converter 10 of the present embodiment, either the first switching control or the second switching control is selectively performed on each switching circuit 20 based on the current instruction value for the switching circuit 20 and the actual current value of the current flowing through the switching circuit 20. Thus, when the current instruction value is smaller than the threshold value, the first switching control can be performed to exclusively utilize the first switching element 22, which has a smaller electric power loss. On the other hand, when the current instruction value is larger than the threshold value, the second switching control can be performed to exclusively utilize the second switching element 24, which has larger allowable current.

Even when the current instruction value is smaller than the threshold value, however, there may be a case where the current flowing through the switching circuit 20 (i.e., the first switching element 22) exceeds the threshold value for some reason. For example, as shown in FIG. 6, there may be a case where the current flowing through the switching circuit 20 temporarily exceeds the threshold value because of unintended disturbance. Alternatively, as shown in FIG. 7, when the current instruction value abruptly changes from a value exceeding the threshold value to a value below the threshold value, the actual current value of the current flowing through the switching circuit 20 might not be able to follow the change, as a result of which the actual current value might exceed the threshold value in subsequent one or more cycles T. In view of this, even when the current instruction value is smaller than the threshold value, the power converter 10 of the present embodiment switches the first switching control to the second switching control to stop driving the first switching element 22, if the actual current value of the current flowing through the switching circuit 20 exceeds the threshold value. A flow of excessively large current in the first switching element 22 can thereby be avoided before it occurs.

A flow of excessively large current in the first switching element 22 can indeed be avoided by switching between the first switching control and the second switching control based only on the actual current value of the current flowing through the switching circuit 20. However, if the switching controls are switched based only on the actual current value of the current flowing through the switching circuit 20, the switching controls might be switched often. This is because, as shown in FIGS. 5 to 7, the actual current value of the current flowing through the switching circuit 20 greatly varies during the cycle T of the switching control. In contrast to this, the power converter 10 of the present embodiment considers not only the actual current value of the current flowing through the switching circuit 20, but also the current instruction value for the switching circuit 20, to thereby suitably decrease frequent switching between the switching controls, while protecting the first switching element 22 against excessively large current.

In the above-described power converter 10, when both the current instruction value and the actual current value fall below the threshold value after switching to the second switching control, the controller 16 switches back to the first switching control. For example, if the actual current value falls below the threshold value while the second switching control is performed, the controller 16 switches back to the first switching control even though the cycle T has not been completed yet. According to such a configuration, an opportunity to drive the first switching element 22 increases, so an electric power loss in the switching circuit 20, for example, can be reduced.

Figure 8:
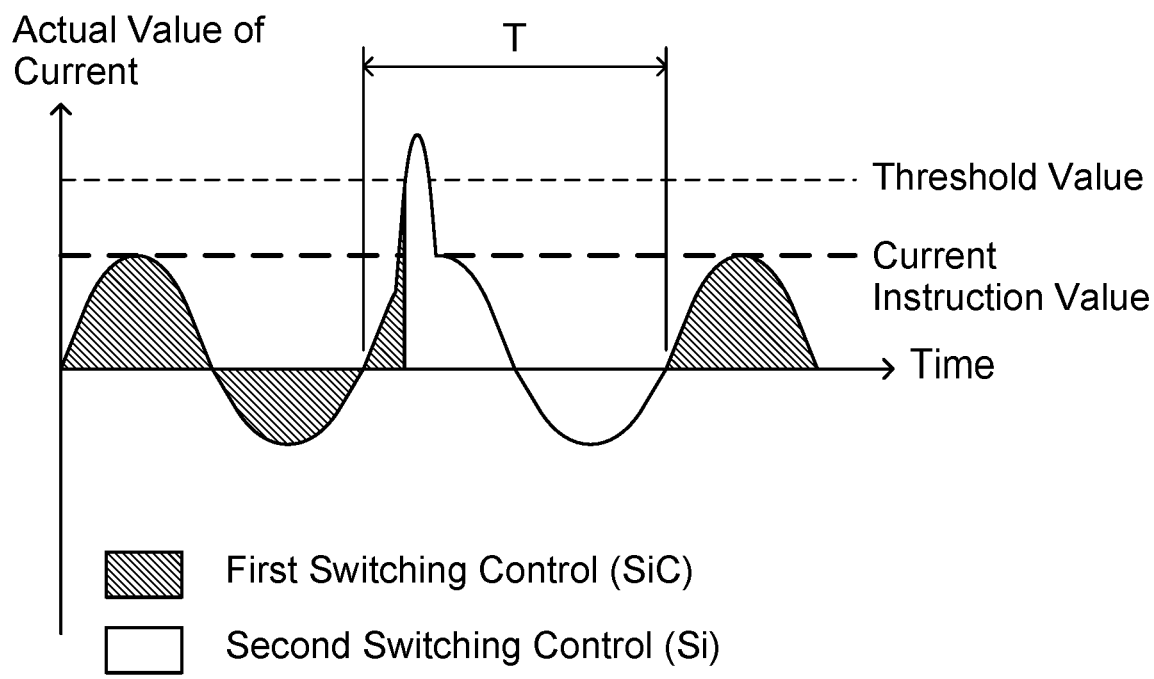
FIG. 8 is a graph showing the instruction value for the current flowing through the switching circuit 20 and the actual value of the current flowing through the switching circuit 20, and shows an example of a state where either the first switching control or the second switching control is selectively performed. In this example, the second switching control is switched back to the first switching control when a cycle T of the second switching control has been completed after switching to the second switching control.
Figure 9:
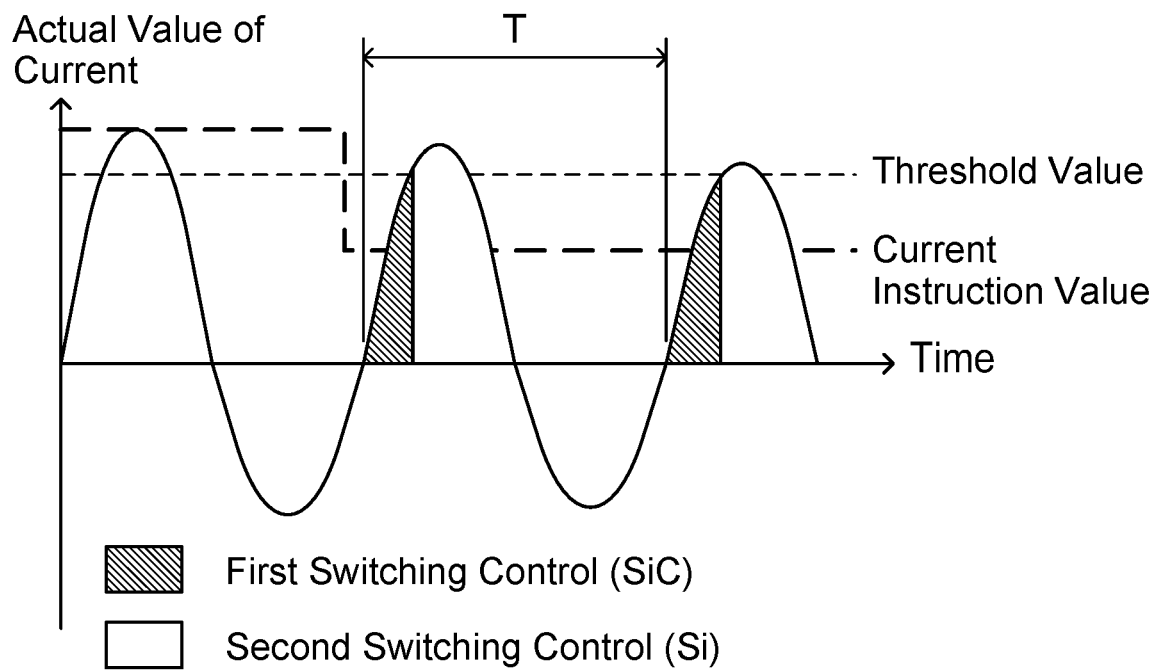
FIG. 9 is a graph showing the instruction value for the current flowing through the switching circuit 20 and the actual value of the current flowing through the switching circuit 20, and shows an example of a state where either the first switching control or the second switching control is selectively performed. In this example, the second switching control is switched back to the first switching control when the cycle T of the second switching control has been completed after switching to the second switching control.

On the other hand, as shown in FIGS. 8 and 9, when the cycle T of the second switching control has been completed after switching to the second switching control, the controller 16 may switch back to the first switching control. In other words, even if the actual current value falls below the threshold value while the second switching control is performed, the controller 16 may continue the second switching control until the cycle T of the second switching control is completed. According to such a configuration, frequent switching between the switching controls is decreased, and the number of times the first switching element 22 is switched can be reduced.

Figure 10:
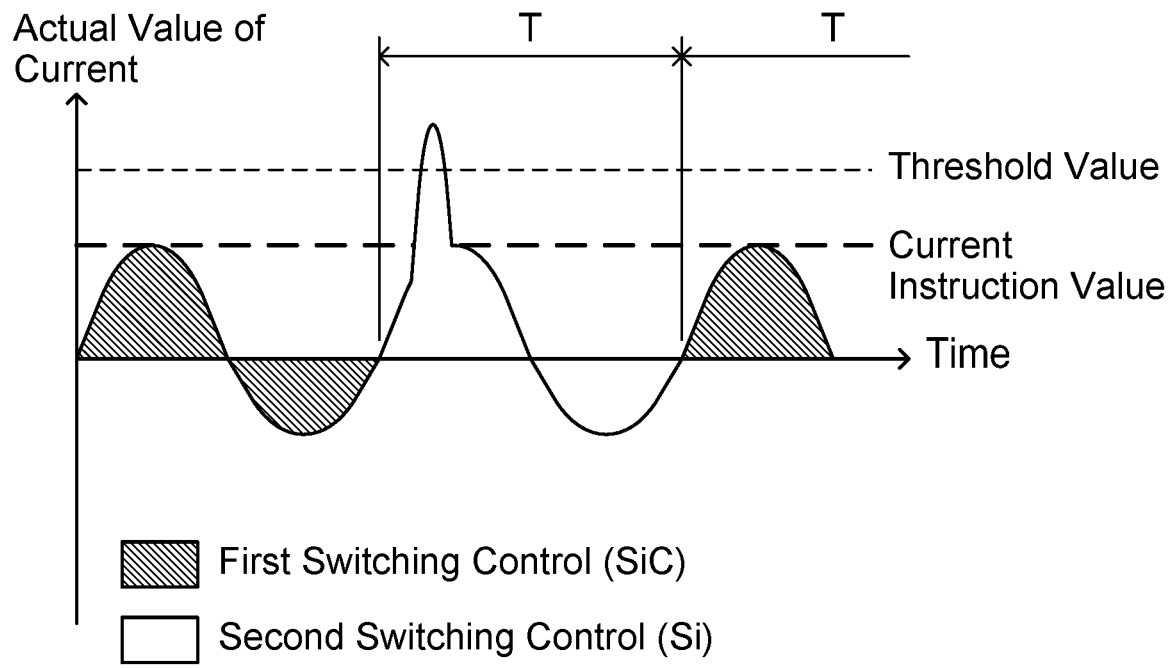
FIG. 10 is a graph showing the instruction value for the current flowing through the switching circuit 20 and the actual value of the current flowing through the switching circuit 20, and shows an example of a state where either the first switching control or the second switching control is selectively performed. In this example, switching to the second switching control is performed in advance when at least one of the instruction value for the current and the actual value of the current is predicted to exceed the threshold value.
Figure 11:
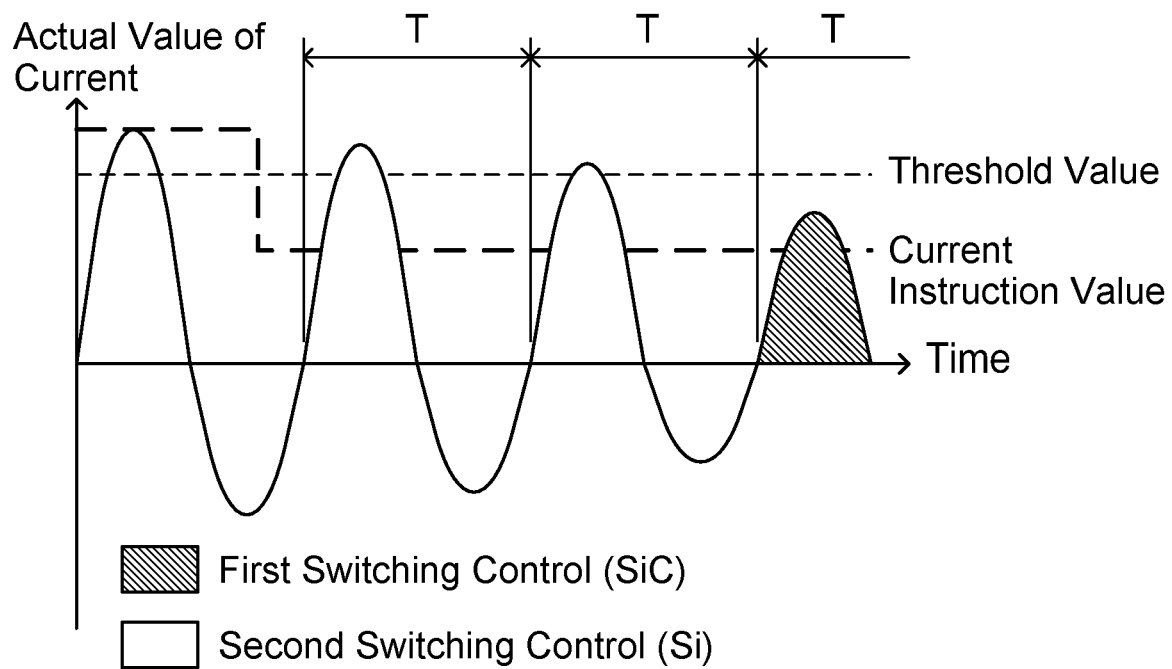
FIG. 11 is a graph showing the instruction value for the current flowing through the switching circuit 20 and the actual value of the current flowing through the switching circuit 20, and shows an example of a state where either the first switching control or the second switching control is selectively performed. In this example, switching to the second switching control is performed in advance when at least one of the instruction value for the current and the actual value of the current is predicted to exceed the threshold value.

Additionally or alternatively, as shown in FIGS. 10 and 11, the controller 16 may perform the second switching control when at least one of the current instruction value and the actual current value is predicted to exceed the threshold value. As described before, when the current instruction value abruptly changes from a value exceeding the threshold value to a value below the threshold value, the actual current value of the current flowing through the switching circuit 20 might not be able to follow the change, as a result of which the actual current value of the current flowing through the switching circuit 20 might exceed the threshold value in subsequent one or more cycles T. In view of this, as shown in FIG. 11, when such a change occurs in the current instruction value, the controller 16 may continue the second switching control in the subsequent one or more cycles T, irrespective of the actual current value of the current flowing through the switching circuit 20. In other words, the controller 16 may suspend the switching back to the first switching control over the one or more cycles T.

What is claimed is:

1. A power converter that converts electric power between a power source and an electric load, the power converter comprising:
   a switching circuit provided on a power supply path from the power source to the electric load, the switching circuit comprising a first switching element and a second switching element that are connected in parallel with each other; and a controller configured to selectively perform either a first switching control to drive the first switching element without driving the second switching element or a second switching control to drive the second switching element without driving the first switching element, based on an instruction value for current flowing through the switching circuit and an actual value of the current flowing through the switching circuit, wherein the first switching element is constituted mainly of a first semiconductor material, the second switching element is constituted mainly of a second semiconductor material and is larger in size than the first switching element, a band gap of the second semiconductor material being narrower than a band gap of the first semiconductor material, the controller comprises:
- a processor configured to generate a common gate drive signal based on the instruction value of the current and the actual value of the current, and
- a gate driver configured to output the common gate drive signal to either the first switching element or the second switching element for selectively performing the first switching control or the second switching control, and the controller is further configured to:
- switch to the second switching control regardless of the actual value of the current when the instruction value of the current exceeds a predetermined threshold value while performing the first switching control; and
- switch to the second switching control regardless of the instruction value of the current when the actual value of the current exceeds the predetermined threshold value while performing the first switching control.

2. The power converter according to claim 1, wherein the controller is further configured to switch back to the first switching control when both the instruction value of the current and the actual value of the current fall below the predetermined threshold value after having switched to the second switching control.

3. The power converter according to claim 1, wherein the controller is further configured to switch back to the first switching control when a cycle of the second switching control has been completed after having switched to the second switching control.

4. The power converter according to claim 1, wherein the controller is further configured to perform the second switching control when at least one of the instruction value of the current and the actual value of the current is predicted to exceed the predetermined threshold value.

5. The power converter according to claim 1, wherein the first semiconductor material comprises silicon carbide (SiC) and the second semiconductor material comprises silicon (Si).

6. The power converter according to claim 1, wherein the first switching element is a Metal-Oxide-Semiconductor Field-Effect Transistor (MOSFET) and the second switching element is an Insulated Gate Bipolar Transistor (IGBT).

* * * * *